United States Patent [19]
Gillis et al.

[11] Patent Number: 4,910,279
[45] Date of Patent: * Mar. 20, 1990

[54] REACTION INJECTION MOULDING COMPOSITIONS COMPRISING A PREPOLYMER AND AT LEAST ONE IMINO-FUNCTIONAL COMPOUND

[75] Inventors: Herbert R. Gillis, Sterrebeek; Eduard F. Cassidy, Ukkel; Alain Parfondry, Evere, all of Belgium

[73] Assignees: ICI Americas, Inc.; Imperial Chemical Industries, PLC, both of Wilmington, Del.

[*] Notice: The portion of the term of this patent subsequent to Dec. 27, 2005 has been disclaimed.

[21] Appl. No.: 163,922

[22] Filed: Mar. 4, 1988

[30] Foreign Application Priority Data

Mar. 11, 1987 [GB] United Kingdom ............... 8705801

[51] Int. Cl.$^4$ .............................................. C08G 18/14
[52] U.S. Cl. ......................................... 528/49; 528/59; 528/61; 528/62; 528/64; 521/159; 264/324.1
[58] Field of Search ................ 521/159; 528/44, 49, 528/59, 61, 62, 64; 264/328.1

[56] References Cited

U.S. PATENT DOCUMENTS

| | | | |
|---|---|---|---|
| 3,682,867 | 8/1972 | Shackelford et al. | 260/ |
| 3,789,045 | 1/1974 | Coury et al. | 260/ |
| 3,892,696 | 7/1975 | Wood | 260/ |
| 3,897,585 | 7/1975 | Wood | 428/395 |
| 4,513,112 | 4/1985 | Ernst et al. | 524/590 |
| 4,554,299 | 11/1985 | Liggett | 523/466 |
| 4,686,242 | 8/1987 | Turner et al. | 521/137 |
| 4,794,129 | 12/1988 | Gillis, Jr. et al. | 521/121 |

FOREIGN PATENT DOCUMENTS 0149765 7/1985 European Pat. Off.
1286246 8/1972 United Kingdom.

OTHER PUBLICATIONS

Bock et al., "New Developments in Polyketimine-Polyisocyanate Chemistry and Their Application ACS-PMSE Preprints"; Fall 1986 Meeting; pp. 448-456.

*Primary Examiner*—John Kight
*Assistant Examiner*—Dennis R. Daley
*Attorney, Agent, or Firm*—Richard A. Rowe

[57] ABSTRACT

A reaction system for use in making a reaction injection moulded elastomer, said system comprising the following components:

(A) a polyisocyanate composition comprising a reaction product of a stoichiometric excess of an organic polyisocyanate and:
 (i) a polymeric polyol having an average nominal hydroxyl functionality greater than 2 and an average hydroxyl equivalent weight of from about 500 to about 5000, and
 (ii) a polymeric polyamine having an average nominal primary and/or secondary amino functionality of from about 2 to about 3 and an average amine equivalent weight of from about 500 to about 5000, the polyol and the polyamine having glass transition temperatures below room temperature.
(B) an isocyanate-reactive composition comprising at least one imino-functional compound.

29 Claims, No Drawings

REACTION INJECTION MOULDING COMPOSITIONS COMPRISING A PREPOLYMER AND AT LEAST ONE IMINO-FUNCTIONAL COMPOUND

This invention relates to compositions of matter used as reaction systems in the production of mouldings by the reaction injection moulding process.

One of the more important methods of making isocyanate based cellular or non-cellular elastomers is the technique known as reaction injection moulding (RIM) whereby two highly reactive liquid streams are impingement mixed and rapidly injected into a mould cavity. The two streams generally comprise a polyisocyanate or derivative thereof, usually known as the "A" component, and an isocyanate-reactive stream, known as the "B" component, commonly containing polyol and/or polyamine reactants.

In some RIM-systems, a one-shot process is used, the polyisocyanate being reacted in a single step with a "B" component comprising an isocyanate-reactive polymer, for example a polyol or polyamine, and a low molecular weight chain extender, for example an aromatic diamine. In other RIM processes an intermediate product, usually called a prepolymer, is first formed by reacting a stoichiometric excess of the polyisocyanate with an active hydrogen compound and is subsequently converted to the final product in a second reaction involving further active hydrogen compound.

Whilst prepolymer processes are apparently less convenient than one-shot systems, in many cases they offer significant advantages. Thus, in general, it is preferred for processing convenience to use polyisocyanate and active hydrogen components that are homogeneous liquids at room temperatures. Unfortunately, one of the most commonly used polyisocyanates, 4,4'-diphenylmethane diisocyanate, is a solid at normal ambient temperatures as is its 2,4'-isomer but many prepolymers made therefrom are stable liquids used in the production of foams, elastomers and the like. In addition to their usefulness in providing liquid components, prepolymers frequently provide a more controllable or desirable balance of reactions than is provided by the corresponding one-shot system and so offer further processing advantages.

When a prepolymer is employed as the "A" component in the RIM process, it can be the reaction product of an excess of polyisocyanate with either a polyol or a polyamine. In some respects, the elastomers obtained from polyol-based prepolymers are superior to those prepared from polyamine-based prepolymers; in other respects, the opposite is the case, both systems having advantages and disadvantages. "B" components used in conjunction with prepolymers typically comprise one or more low molecular weight chain extender, which can include aromatic and aliphatic polyamines and aliphatic polyols, and optionally one or more higher molecular weight polyol or polyamines. Whilst the high reactivity of polyamines is advantageous in some respects, for example short mould residence times, it can also cause problems in filling large complex moulds.

It has now been found that when certain polyisocyanate compositions containing both polyol- and polyamine-based prepolymers are used as "A" compounds in conjunction with "B" components containing one or more imino-functional compounds, a more desirable reaction profile is observed, an initial induction being followed by a sudden and rapid reaction. Furthermore, it has been found possible to prepare elastomers having both the high modulus values characteristics of polyamine systems and the excellent impact resistance associated with polyol based systems.

Thus, according to the invention, there is provided a reaction system for use in making a reaction injection moulded elastomer, said system comprising the following components:

(A) a polyisocyanate composition comprising a reaction product of a stoichiometric excess of an organic polyisocyanate and:
 (i) a polymeric polyol having an average nominal hydroxyl functionality greater than 2 and an average hydroxyl equivalent weight of from about 500 to about 5000, and
 (ii) a polymeric polyamine having an average nominal primary and/or secondary amino functionality of from about 2 to about 3 and an average amine equivalent weight of from about 500 to about 5000, the polyol and the polyamine having glass transition temperatures below room temperature; and (B) an isocyanate-reactive composition comprising at least one imino-functional compound which has at least one imino group that is directly reactive towards isocyanates and which conforms to the following structure

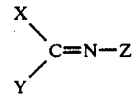

wherein X, Y, and Z are chemical moieties which collectively form the rest of said compound and are each independently selected from the group consisting of H and organic radicals which are attached to the imino unit

of said compound through N, C, O, S, Si or P; the central carbon atom of the imino unit

of said imino group being bonded to these atoms.

Organic polyisocyanates which may be used in preparing the component (A) of the reaction include aliphatic, cycloaliphatic, araliphatic and aromatic polyisocyanates and mixtures thereof, especially diisocyanates. For most purposes, it is preferred to use aromatic polyisocyanates or polyisocyanate mixtures in which an aromatic polyisocyanate is the major component.

Examples of suitable polyioocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates and 1,5-naphthylene diisocyanate. In general, the preferred polyisocyanates are the available MDI isomers, that is to say 4,4'-diphenylmethane diisocyanate, 2,4'-diphenylmethane diisocyanate, and mixtures thereof. There may also be used modified polyisocyanates, for example MDI variants such as uretonimnne-modified MDI, either alone or in admixture with other polyisocyanates.

The term "nominal hydroxyl functionality" as used above in defining the polymeric polyol used in making the polyisocyaaate compositions means the hydroxyl functionality that a polymeric polyol would be expected to have having regard to its monomeric components. For example, a polyether prepared by the addition of propylene oxide to a glycol will have a nominal hydroxyl functionality of 2 although, in practice, its average functionality will be somewhat less than 2. Thus, for a polyether, the average nominal hydroxyl functionality is the average functionality (number of active hydrogen atoms) of the initiator or initiators used in its preparation.

The average nominal hydroxyl functionality of the polyol used in preparing the polyisocyanate compositions is typically from 2.5 to 4, for example about 3. The average hydroxyl equivalent weight of the polyol is preferably in the range from 800 to 2000. Mixtures of two or more polyols varying in functionality, equivalent weight or chemical constitution may be used provided such mixture conform to the average functionality and average equivalent weight criteria displayed above.

Polymeric polyols having average hydroxyl functionalities greater than 2, average hydroxyl equivalent weights in the range 500 to 5000 and glass transition temperatures below room temperature are well known as polyurethane components and may be prepared by methods fully described in the prior art. As examples of suitable polools there may be mentioned polythioethers, polyesters, polyesteramides, polycarbonates, polyacetals, polyolefins, polysiloxanes and, especially, polyethers.

Polyether polyols which may be used include products obtained by the polyaddition of one or more alkylene oxides to initiators having three or more active hydrogen atoms. Such polyethers may be used in conjunction with polyether diols in appropriate proportions so that the polyol mixture has the desired overall functionality. Thus, suitable polyether polyols or mixtures of polyols may be selected from the reaction products of propylene oxide or propylene and ethylene oxides with polyfunctional initiators such as water, ethylene glycol, propylene glycol, diethylene glycol, glycerol, trimethylolpropane, pentaerythritol or sorbitol. Especially useful polyethers include polyoxypropylene triols and poly(oxyethylene-oxypropylene) triols obtained by the simultaneous or sequential addition of ethylene and propylene oxides to trifunctional initiators. In many cases, ethylene oxide tipped triols are preferred because of their enhanced reactivity. Mixtures of triols with corresponding polyether diols are also very useful.

Polyester polyols which may be used in preparing the polyisocyanate compositions include hydroxyl terminated reaction products of polyhydric alcohols such as ethylene glycol, propylene glycol, diethylene glycol, neopentyl glycol, 1,4-butanediol, glycerol, trimethylolpropane or pentaerythritol with polycarboxylic acids, especially dicarboxylic acids or their ester-forming derivatives, for example succinic, glutaric an adipic acids or their dimethyl esters, phthalic anhydride or dimethyl terephthalate, the starting materials being chosen in known manner to give polyesters of the desired functionality. Polyesters obtained by the polymerization of lactones, for example caprolactone, in the presence of a polyol, may also be used. Polyesteramides may be obtained by the inclusion of aminoalcohols such as ethanolamine or polyamines such as ethlene diamine in polyesterification mixtures.

The term "noiinal primary and/or secondary amino functionality" as used above in defining the polymeric polyamine used in making the polyisocyanate compositions means the amino functionality that a polymeric polymmine would be expected to have having regard to the materials used in its manufacture. For example, a polyether polyamine prepared by the reductive amination of a polyether diol will have a nominal amino functionality of 2 although, in practice, the average hydroxyl functionality of the diol will be somewhat less than 2 and the conversion of hydroxyl to amino groups will not be entirely complete. It is preferred that at least 70%, and most preferably at least 85%, of the functional groups are primary or secondary amino groups. For most purposes, polymeric polyamines in which at least 70% of the amino groups are primary amino groups are preferred.

The average nominal amino functionality of the polyamine used in preparing the polyisocyanate compositions is preferably in the range from 2.5 to 3. The average amino equivalent weight of the polyamine is preferably in the range from 800 to 2000, especially from 800 to 1700. Mixtures of two or more polyamines varying in functionality, equivalent weight or chemical constitution may be used provided such mixtures conform to the average functionality and average equivalent weight criteria displayed above.

Polymeric polyamines having average amino functionalities of 2 or more, average amino equivalent weights in the range 500 to 5000 and glass transition temperatures below room temperature are well known as components of polyurea and polyurea-polyurethane formulations and may be prepared by methods fully described in the prior art. As examples of suitable polyols there may be mentioned amino-terminated polythioethers, polyesters, polyesteramides, polycarbonates, polyacetals, polyolefins, polysiloxanes and, especially, polyethers.

Polyether polyamines which may be used include products obtained by the reductive amination of poyether polyols as described, for example, in U.S. Pat. No. 3,654,370. Polyether polyamines may also be prepared by the cyanoethylation of polyols followed by hydrogenation. Polyoxypropylene diamines and triamines and poly(oxy- ethylene-xypropylene) diamines and triamines and mixtures of any of these are preferred.

The excess of organic polyisocyanate used in preparing the polyisocyanate compositions is suitably such that the compositions have free NCO contents in the range from 8% to 25%, and especially from 12% to 20%, by weight.

The polyisocyanate compositions may be prepared by reacting the organic polyisocyanate with the polymeric polyol and the polymeric polyamine in any convenient manner. Thus, a stoichiometric excess of the polyisocyanate may be reacted with a mixture of polyol and polyamine, or, alternatively, the polyisocyanate may be reacted in excess quantities separately with the polyol and the polyamine to form an isocyanate terminated polyol based prepolymer and an isocyanate terminated polyamines based prepolymer which are subsequently mixed. The polyisocyanate may also be reacted with the polyol and the polyamine sequentially in either order. Compositions prepared by reacting the excess of polyisocyanate with a mixture of the polyol and the polyamine or, sequentially, with the polyol and the polyamine or with the polyamine and the polyol are preferred for use in the production of elastomers having excellent flexural modulus, impact resistance and thermal stability. Compositions prepared by reacting the excess of polyisocyanate first with the polyol to form an isocyanate terminated polyol based prepolymer which is then reacted with the polyamine are particularly suitable for certain applications. Where the compositions are prepared by mixing two prepolymers, it is not essential that both prepolymers have the same NCO content. It is possible, for example, to blend a polyol based prepolymer having a relatively low NCO content with a polyamine based prepolymer having a relatively high NCO content. Furthermore, compositions can be prepared having low NCO contents which may then be raised by the addition of further organic polyisocyanate which may be the same as or different from the polyisocyanate used in preparing the composition.

In preparing the polyisocyanate compositions, reaction between the organic polyisocyanate and the polyol and polyamine may be effected using conditions that have been fully described in the prior art for the production of prepolymers. Thus, in a typical reaction, a stoichiometric excess of the organic polyisocyanate is reacted separately, simultaneously or sequentially with one or more polyols and one or more polyamines under substantially anhydrous conditions at temperatures between about 30° C. and about 130° C., preferably from 60° C. to 110° C., until reaction between the isocyanate groups and the hydroxyl and amino groups is substantially complete.

To achieve the desired NCO contents, the polyisocyanate and active hydrogen compounds are suitably reacted in such proportions that the ratio of NCO groups to hydroxyl or amino groups is in the range from about 4.5:1 to about 35:1, preferably within the range of from 7.0:1 to 17.5:1. Regardless of the preparative method used, the relative proportions of polyol and polyamnne generally correspond to an initial hydroxyl/amino group ratio in the range from 5:95 to 95:5, preferably from 25:75 to 75:25 and most preferably from 35:65 to 65:35.

If desired, catalysts may be used to assist production of the polyisocyanate compositions. Suitable catalysts are known in the polyurethane and polyurea art and include tin compounds such as dibutyltin dilaurate and stannous octoate and tertiary amines such as triethylene diamine.

The "B" component of this invention is an isocyanate-reactive composition which comprises at least one imino-functional compound capable of reacting directly with polyioocyanate composition (i.e. without prior cleavage of the C=N bond to form a monomeric by-product), present as a softblock component and/or as a chain extender. If an imino-functional compound is present as a chain extender, it will in general be an imino-functional compound having a molecular weight less than 1500, preferably less than 600. If an imino-functional compound is to be used in the softblock (or rubbery phase), it will in general be an imino-functional aliphatic polyether resin with a molecular weight of at least 1500, preferably 2000 to 8000, and a number-averaged functionality of imino (C=N) groups at least 1.1, preferably from about 2 to about 4.

"Imino-functional" as used herein means that a reactant contains the grouping

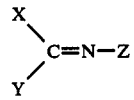

as defined above, wherein said grouping is capable reacting directly with isocyanates. Preferred classes of imino-functional groupings include imines, oxazolines, imidazolines, N-aryl imidazolines, oxazines, diazines, imino-esters, amidines, imidines, isoureas and guanidines, as hereinafter further defined. In the imino-functional compounds, it is preferred that Z is attached to the imino unit through carbon and that X and Y are independently H or organic radicals attached through an atom selected from C, N, and O X , Y, and Z are preferably attached through saturated aliphatic carbon atoms.

The range of imino functional reagents which may be used in the invention are not limited by or to any particular chemistry for the preparation of said reagents. For example, imine terminated aliphatic polyethers may be made by a number of different routes. Specifically, the amine groups ($—NH_2$) of an aliphatic amine-terminated polyether can be prereacted with an aldehyde ($RCH_2CHO$) or a ketone ($R^1—CO—R^2$) to form, respectively, the corresponding aldimine

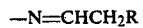

or the corresponding ketimine

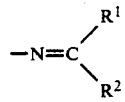

wherein R, $R^1$, and $R^2$ are hereinafter subsequently wherein R, $R^1$, and R2 are hereinafter subsequently defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

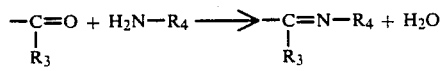

wherein: $R_3$=H or alkyl, $R_4$=H or alkyl, $R_3$ and $R_4$ being more fully defined hereinafter. The direct reaction of compounds containing isocyanate groups with compounds containing imine groups is known, see "New Developments in Polyketimine-Polyisocyanate Chemistry and Their Application": ACS-PMSE preprints: Fall-1986 meeting: pp 448-456 U.S. Pat. No. 3,789,045 and GB Pat. No. 1286246. It is also known to react polyisocyanates with polyamines in a reaction moderating solvent such as ketone or aldehyde solvents, see U.S. Pat. No. 3,892,696 to Wood and U.S. Pat. No. 3,897,585 (also to Wood) which is a Continuation-in-part thereof. It is also known to react aliphatic polyisocyanates with mixture of polyamines and polyimines as disclosed in U.S. Pat. No. 4,554,299 to Ligget. It is also well known to react polyisocyanates with polyimines in the presence of moisture whereby the purpose of the moisture is to hydrolyze the imine and liberate free amine which in turn reacts with the isocyanate present. This indirect process of reacting polyimines and polyisocyanates is described, for example, in European Pat. 149,765 to Arendt. It is not useful for RIM. Such indirect reactions are outside the scope of this invention. Many types of imino-functional compounds are useful in this invention, including (but not limited to) those listed in Table A, following:

TABLE A

| | TYPE |
|---|---|
| ⓟ—R$^5$—C(R$^6$)=N—R$^7$ | Simple imine |
| ⓟ—R$^5$—O—C(R$^6$)=N—R$^7$ | Imino ester |
| ⓟ—Ar—O—C(R$^6$)=N—R$^7$ | Imino ester (aromatic) |
| ⓟ—R$^5$—N=C(R$^6$)(R$^7$) | Simple imine |
| ⓟ—R$^5$—NR$^6$—C(R$^7$)=N—R$^8$ | Amidine |
| ⓟ—R$^5$—N=C(R$^6$)(Ar') | Simple imine (aromatic) |
| ⓟ—R$^5$—NR$^6$—C(R$^7$)=N—Ar' | Amidine (aromatic) |
| ⓟ—R$^5$—C(OR$^7$)=N—R$^6$ | Imino ester (aliphatic) |
| ⓟ—R$^5$—C(OAr')=N—R$^6$ | Imino ester (aromatic) |
| ⓟ—R$^5$—NH—C(NHR$^6$)=NR$^6$ | Guanidine |
| ⓟ—R$^5$—NR$^7$—C(=NR$^8$)(NR$_2^8$) | Guanidine |
| ⓟ—R$^5$—NH—C(NHAr')=NAr' | Guanidine (aromatic) |
| ⓟ—R$^5$—O—C(NHR$^6$)=N—R$^6$ | Isourea |
| ⓟ—R$^5$—O—C(NH$_2$)=N—R$^7$ | Isourea | wherein:

R$^5$ and Ar are divalent aliphatic and aromatic organic linking groups, respectively;

ⓟ represents a polyether or hydrocarbon chain or radical, to which said imino (C=N) functional group is attached as indicated by the drawings.

R$^6$ is H or a monovalent organic aliphatic group of 1 to 10 carbons:

R$^7$ and R$^8$ are monovalent aliphatic organic groups of 1 to 10 carbon atoms, and Ar' is a monovalent aromatic organic group of 6 to 18 carbon atoms.

These stated groups are well known in the art. Thus R$_5$ may in particular be propylene, Ar methoxyphenylene, R$_6$ propyl, R$_7$ propyl, R$_8$ propyl and Ar' methoxyphenyl.

It is noted that in the above formulas any two of the three substituents attached to the imino unit can be incorporated as members of a non-aromatic 5 or 6 membered ring. The ring can be carbocyclic or htterocyclic depending of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomlia, US 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated sottblocks from cyanoethylated polyether polyols would be the method otlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Intescience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

It is preferred that component "B", the isocyanate-reactive composition comprises:

(i) a chain extender comprising (a) 0–100% of an aromatic polyamine having a nurber-averaged functionality of aromatically bound primary and/or secondary amine grouss of from about 1.8 to about 3.0, a number-averaged molecular weight of from about 100 to about 400, and wherein at least 50 mole percent of the species comprising said polyamine are diamines, and, correspondingly, (b) 100–0% of an imino-functional compound having a number-averaged molecular weight less than 1500 and a number-averaged functionality of isocyanate-reactive imino units of about 1 to about 3, and (ii) an imino-functional polyether resin having an average of from about 1.1 to about 5 isocyanate-reactive imino groups per molecule and a number-averaged molecular weight of from 1500 to about 10,000, wherein said imino groups constitute at least 50 mole percent of the isocyanate-reactive groups in said polyether resin, and at least 50 mole percent of said imino-functional polyether species contain two or more imino (C=N) groups per molecule;

the weight ratio of said reactant B(i) to said reactant B(ii) being in the range of about 9:1 to about ]9. It is preferred that the weight ratio of chain extender component B(i)(b) to chain extender component B(i)(a) be between about 0 and about 10, preferably between 0.1 and about 5, and most preferably between 0.25 and 2. It is also preferred that the molecular weight of the imino-functional compound B(i)(b) is between about 100 and about 600.

Component (B) (i) useful herein is in general a chain extender. Preferred chain extenders include aromatic polyamines, imino-functional aliphatic or aromatic compounds having a molecular weight less than 1500, and mixtures thereof.

Aromatic polyamines useful as chain extedders in this invention have a number-averaged functionality of aromatically bound primary and/or secondary isocyanate reactive amine groups of from about 1.8 to about 3.0, preferably from 1.9 to 2.2, and a number averaged molecular weight which ranges from about 100 to about 400, preferably between 122 and 300. At least about 50 mole percent, preferably at least 80 mole percent, of the specie comprising said polyamine are diamines. Preferably, at least about 95 mole % of amine groups, whether primary or secondary, are aromatically bound.

Examples of suitable aromatic polyamines include 3,5-diethyl-2,4-toluenedimine: 3,5-diethyl-2,6-toluenediamine; DETDA which is a mixture of about 80 percent by weight 3,5-diethyl-2,4-toluenediamine and about 20 percent by weight 3,5-diethyl-2,6-toluenediamine; 1,3,5-triethyl-2,6-diaminobenzene; 2,4-diaminotoluene; 2,6-diaminotoluene;2,4'-diamino- diphenylmethane; 4,4'-diamino-diphenylmethane; 3,3'-dimethyl-5,5'-diethyl-4,4'-diaminodiphenylmethane; 3,3',5,5'-tetraisopropyl-4,4'-diamino diphenyl-methane polyphenyl-polymethylene polyamines; and the like. It is also possible to employ, in component B(i), in addition to or in place of the aromatic polyamines noted above, between 0 and 100% by weight, based on the total weight of B(i), of low molecular weight imino-functional species having a molecular weight less than 1500 wherein each such imino-functional species contains at least one imino unit per molecule. Preferably such imino-functional species have a number-averaged molecular weight less than 600, a number-averaged functionality of imino units between about 1.2 and about 2.5, wherein each imino unit is bonded to aliphatic and/or aromatic groups X, Y and Z. Examples of preferred compounds are aliphatic polyether resins terminated with aliphatic imine groups which can be made in facile manner by reacting a commercially available low molecular weight amine-terminated polyether resin such as JEFFAMINE ® D-400 or JEFFAMINE ® D-230 with an aldehyde or ketone to form, respectively, the corresponding aldimine or ketimine. Other examples include simple bis-ketimines or bis-aldimines of 1,6-hexamethylene diamine, isophorone diamine, menthane diamine, and the like; bis-oxazolines, bis-thizzolines, or bis-imidazolines derived from adiponitrile or adipic acid, etc.

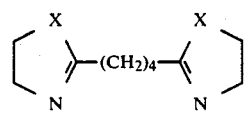

where X is O S, NH, N-R, or N-Ar:

R is a monovalent aliphatic organic group of 1 to 10 carbons and Ar is an aromatic organic group of 6 to 18 carbons.

Aliphatic low molecular weight polyamine compositions may also be employed, in minor amounts not exceeding 40% by weight based upon the total weight of ingredients B(i)+B(ii), preferably less than 20%, more preferably less than 10%, and most preferably less than 1%, as an optional chain extender in stream (B). Useful aliphatic amines contain acyclic, linear or branched chains of atoms between reactive (primary and/or secondary) amine groups. These amine groups (by definition) are bonded directly, via the mine nitrogen atom, to aliphatic carbon atoms of the connecting structure. The number-averaged molecular weight of the aliphatic polyamine (or mixture of aliphatic polyamines) used in this invention is less than about 1500, preferably between 200 and 450. The number averaged isocyanate-reactive amine functionality is between 1 and 3, preferably between 2 and 2.3. The aliphatic polyamine composition should preferably be at least 50 mole percent, preferably at least 70 mole percent, diamines.

It is preferred that the aliphatic amine composition be substantially free of individual (reactive amine-containing) molecular species of molecular weight less than 170. If molecular amine species of molecular weight lower than 170 are present, they should constitute less than 20% by weight of the total aliphatic amine composition, and less than 5% of the total polyurea composition (by weight, relative to the total weight of reactive components).

It is preferred that a majority of any primary aliphatic amine groups within the aliphatic amine composition, most preferably greater than 80% of these primary amine groups, are bonded directly (via the amine nitrogen atom) to secondary and/or tertiary carbon atoms.

Examples of suitable aliphatic polyamines include the amine-terminated polyethers such as those represented below:

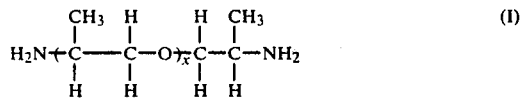  (I)

wherein x has an average value between 2 and about 6.

Polyether diamines such as Formula I, above, may be used as mixtures with higher functionality polyether polyamines such as Formula II (below), provided that the mixture meets the requirements of number averaged amine functionality and molecular weight described previously:

II
CH$_3$—CH$_2$—C$+$CH$_2$—(O—CH$_2$—CH(CH$_3$)-)$_z$—NH$_2$)$_3$     (II)

wherein z has an average value between about 1 and about 2.

"B" Component—Higher Molecular Weight Softblock Resin

The preferred imine-terminated polyethers used as component (B)(ii) herein can be madebby reacting an aldehyde or ketone with an amine-termin-ated polyether. The aldehyde- or ketone-derived product is an irreversibly-formed imine which (along with the chain extender and the polyisocyanate) is reacted into the polyurea such that the polyurea contains urea linkages having substituted urea nitrogen atoms along the polymer backbone. Suitable amine-terminated polyethers are available commercially under the registered trademark JEFFAMINE from Texaco and include JEFFAMINE D-4000, a 4000 molecular weight primary amine terminated polypropylene oxide diamine: JEFFAMINE D-2000, a 2000 molecular weight primary amine terminated polypropylene oxide diamine: JEFFAMINE T-5000, a 5000 molecular weight primary amine terminated polypropylene oxide triamine; JEFFAMINE T-3000, a 3000 molecular weight primary amine terminated polypropylene oxide tramine: JEFFAMINE ED-2000, a 2000 molecular weight primary amine terminated polyoxypropylene polyoxyethylene copolymer diamine.

Another class of suitable aliphatic amine- terminated polyethers includes the following:

wherein $R^9$ is an organic polyfunctional structure containing aliphatic ether linkages (for example, polyoxypropylene chains). The size of $R^9$ is such that the molecular weight of the amine-terminated polyether resin is 1500 or higher (to a maximum of about 10,000). The functionality of $R^9$, (i.e. x), is prefrably 2 or 3. Of course, mixtures of different species may be used if desired. Structures of the type shown immediately above may, for example, be made by cyanoethylation of polyether polyols (with acrylonitrile, or the like) and subsequent reduction (i.e. hydrogenation) of the nitrile end-groups to free primrry aliphatic amines. The polyether based resins used to prepare component B(ii) may also contain groups other than ether linkages. For example, amide linkages, thoiether linkages, imide linkages, siloxane linkages, and so forth, provided that these are chemically inert towards the aliphatic imine end groups or other imino groups used.

Suitable aldehydes for making the preferred imine-terminated aliphatic polyethers have the formula

and suitable ketones have the formula

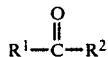

In the above R, $R^1$ and $R_2$ can be saturated aliphatic goups having 1-10 aliphatic carbon atoms and may contain aromatic unsaturation. In each case it is preferred that the carbon atom alpha to the carbonyl group in an aldehyde, and at least one carbon atom alpha to the carbonyl group in a ketone, be saturated. It is more preferred that both the carbon atoms alpha to the ketone carbonyl group be saturated. By "saturated", it is meant that the carbon atoms in question are bonded each directly to 4 atoms. At least one of the R groups adjacent to the carbonyl preferably contains at least one proton adjacent to the carbonyl group (for both aldehydes and ketones).

Suitable aldehydes include, for example, formaldehyde, acetaldehyde, propionaldehyde, n-butyraldehyde, isobutyraldehyde heptadehyde, α-methylvaleraldehyde, β-methylvaleraldehyde, caproaldehyde, isocaproaleehyde, cyclohexyl aldehyde, mixtures of these, and the like.

Suitable ketones include acetone, methyl ethyl ketone, methyl n-propyl ketone, diethyl ketone, methyl isopropyl ketone, benzyl methyl ketone, cyclohexanone, mixtures of these, and the like.

Suitable imine-terminated polyethers may also be prepared starting with the analogous polyether polyols, i.e. the hydroxyl-terminated analogues of the above amine-terminated polyethers. The hydroxyl- terminated polyethers can be oxidized to the ketone- or aldehyde-terminated species. The ketones can then be reacted with an aliphatic amine having one primary amine group. The polyamine can have 1-20 carbon atoms, preferably 1-10 carbon atoms. Simple aliphatic primary amines having 1-8 carbon atoms are most preferred, including methylamine, ethylamine, propylamine, n-butylamine, isobutylamine, cyclohexylamine and hexylamnne.

The reaction to form the iiine-terminated polyether is facile, but it is important when making simple imines to remove substantially all water from the imine-terminated product and maintain (e.g. store) the product under anhydrous conditions. The reaction is conducted by combining the amine-terminated species with the carbonyl-containing species and heating until the imine-forming reaction is complete, typically 20 minutes to several hours, while providing for removal of the $H_2O$ formed during the reaction (i.e. by vacuum). If the amine-containing species is the amine-terminated polyether, the reaction is conducted using excess aldehyde and/or ketone. If a high-molecular weight polyether is the carbonyl- containing component, then an excess of the primary amine is preferably used, in order to insure imine formation.

Excess unconsumed volatile reactant (aldehyde or ketone or simple amine) is stripped from the product, whereby water formed during the reaction is also stripped so that the product is maintained anhydrous. With some volatile compounds such as acetone, it may be necessary to add a solvent such as toluene so that an azeotropic distillation can be affected or so that the boiling point approaches or exceeds that of water.

Many imino-functional compounds other than simple imines (e.g. oxazolines, guanidines, imidazolines, oxazines, imidines, diazines) are not moisture-sensitive and the presence of water during formation, processing, or storage of these imino groups has substantially no effect on their reaction.

If the reagent used in excess during the imine-forming reaction cannot be conveniently removed from the system after the reaction (i.e. by vacuum distillation, or some other separation technique), then the extent of the excess employed should be such that the amount of this unreacted material which is left in the imine-terminated polyether resin does not exceed about 5% by weight of the total resin, preferably not more than 2%, and most preferably less than 1%.

The aliphatic polyether product, imine- terminated as described above, preferably has a number-averaged imine functionality of from about 1.6 to about 3, and the imine groups comprise at least 50 mole percent, preferably at least 70 mole percent, of isocyanate-reactive functional groups present therein.

In a preferred embodiment, substantially all of the groups bonded to the polyether imine nitrogen or imine carbon are aliphatic, preferably saturated aliphatic.

It is further preferred that the number-aveaged molecular weight of the imin-terminated polyether softblock be between 2000 and 8000, and that the polyether be substantially free of components having a molecular weight less than about 1500. It is further preferred that at least 70 mole percent of the imine-terminated molecules comprising the polyether be di-imines and/or tri-imines.

In addition to the imino-functional polyethers described above, the reaction system stream (B) may also contain supplemental higher molecular weight isocyanate-reactive hydrogen-containing material. A preferred group of active hydrogen-containing materials useful as optional softblock resins have an average molecular weight of at least 1500, preferably at least 2000 up to about 100,000, an average active hydrogen group functionality from 2 to 6, preferably from 2 to 3, active hydrogen-containing groups wherein at least 70 percent, preferably at least 85 percent, of the groups are primary and/or secondary aliphatic and/or aromatic amine groups. The amount of these supplemental high-molecular-weight isocyanate-reactive materials in component B should be less than 50% by weight of the amount of component B(ii), preferably less than 25%, and most preferably less than 10%. The ratio of the number of active hydrogen containing groups in this supplemental high-molecular-weight resin to the number of imino groups in component B(ii) is less than 0.5, preferably less than 0.25, and most preferably less than 0.1.

Examples of suitable supplemental high molecular weight active hydrogen-containing materials include amine terminated polyethers, amine terminated organopolysiloxanes, amine terminated polymers with hydrocarbon main chain, amine terminated polyamides, and the like. Suitable amine terminated polyethers have a molecular weight of about 2000 to about 10,000, and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixutres or as blocks of one or the other polyether. Normally, the amination step does not completely replace all of the hydroxyl groups. For use in the invention, compounds having at least 70 percent of the hydroxyl groups converted to primary and/or secondary amine groups are preferred and those having at least 85 percent are most preferred. Amination of the polyol may be accomplished by a large number of prior art methods, for example, by reductive ammination or by cyanoethylation followed by hydrogenation of the nitrile end groups.

If it is desired to reductively amminate a polyethylene oxide polyol, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,653,370, incorporated herein by reference.

A single high molecular weight amine terminated polyether may be used. Also, mixtures of amine terminated polyethers such as mixtures of di- and tri-functional materials and/or different molecular weights or different chemical composition materials may be used.

Suitable amine terminated organopoly siloxanes include, for example, those represented by the formula

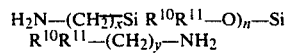

where
- $R^{10}$ and $R^{11}$ independently are aryl groups or alkyl groups containing from 1 to 8 carbon atoms including methyl, ethyl, propyl, butyl, phenyl, pentyl, hexyl, octyl, or branched chains thereof, cyclobutyl, cyclopentyl, cyclohexyl, cycloheptyl, and cyclooctyl.
- $R^{10}$ and $R^{11}$ may be the same or different, and
- x and y have values from about 3 to about 10, and x and y may be the same or different, and
- n is selected such that the formula has a molecular weight of at least about 1500.

A specific example of such a polysiloxane material is PS-513, which is commercially available from Petrarch Systems Inc. This is a linear polydimethyl siloxane fluid which contains terminal aminoprpyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the formula

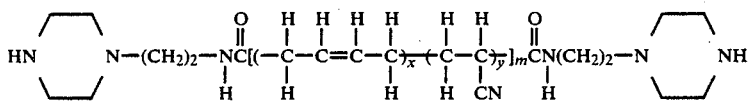

where
- x may be 1–10, and
- y may be 0–5, and
- m is selected such that the formula has molecular weight of at least 1500.

Such reactive liquid polymers are commercially available from B. F. Goodrich as HYCAR ATBN 1300×16 and HYCAR ATBN 1300×21.

Stream (B) may further comprise hydroxyl-containing species such as one or a mixture of polyols which have n average molecular weight of at least 1500 and an average hydroxyl functionality from 2 to 8. The total of hydroxyl groups amount to less than 30 percent, equivalents basis, of the aliphatic imine groups in component B(ii), preferably less than 15 percent. Examples of suitable high molecular weight polyols include, for example, hydroxyl terminated polyxxpropylene: polyoxypropylene-polyoxyethylene copolymers: polyoxypropylene-polyoxybutylene copolymers and polytetramethylene oxide diols. The amount, by weight, of these polyols should not exceed 50% of the weight of the imine-terminated polyether resin BB-ii), and preferably should be less than 25%, most preferably less than 10%, of the weight of B(ii).

The reaction systems of the present invention can further include additives such as internal mold release agents, catalysts, surfactants, blowing agents, fillers (which may be reinforcements), plasticizers, fire retardants, coupling agents, and the like.

Suitable internal mold release agents include, for example, copper stearate, zinc stearate and a dimethyl polysiloxane with organic acid groups which is commercially available as Dow-Corning Q2-7119 from Dow-Corning Corporation. Other organo polysiloxanes bearing organic hydroxyl groups (instead of acids) can also be used. A specific example of a very effective, hydroxy functional, polysiloxane internal mold release additive is Goldschmidt-412T (available from Goldschmidt Silicones). The amount of internal mold release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, diethyltin dihexyltin diacetate, di-2-ethylhexyltin oxide, stannous octoate, stannous oleate, or a mixture thereof.

Tertiary amine catalysts include trialkulamines which include, for example, triethylamine: heterocyclic amines such as N-alkylmorpholines which include, for example, N-methylmorpholine, N-ethylmorpholine; 2,2'-bis(dimethylamino)diethyl ether; 1,4-dimethylpiperazine, triethyeenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic aciss, may also be added to the formulations of the invention.

Another group of catalysts, which are more specific for the isocyanate-amine reaction, and particularly for the reaction of isocyanates with aliphatic imines, include carboxylic acids and precursors thereof (such as acid anhydride). Specific examples of carboxylic acid catalysts include oleic acid, 1,12-dodecanedioic acid, isophthalic acid, and the like. These types of catalysts are described in U.S. Pat. Nos. 4,499,254: 4,487,908; and 4,487,912; and in U.S. Pat. No. 3,789,045 (for the imine-isocyanate rxn.)

It is often preferable to use a catalyst for the imine-isocyanate reaction in the polyurea formulations of this invention. The use of catalysts is, howevr, not essential. When catalysts are used, it is preferred to incorporate the into the isocyanate stream (A) and hence to isolate them from component B, until after the impingement mixing step. Suitable catalysts, or latent catalysts, which may be incorporated into the isocyanate stream include carboxylic acids. Particluarly preferred are fatty acids such as oleic acid. Organic carboxylic acid anhydrides are preferred as latent catalysts for use in the A-stream, for example, cis-1,2-cyclohexane-dicarboxylic acid anhydride (1).

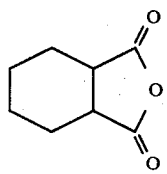

-continued

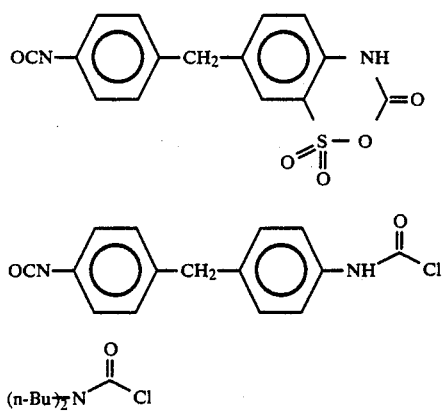

Other potential catalysts, or catalyst precursors' for use in the isocyanate include organic acid halides, such as butyryl chloride or benzoyl chloride: sulfonic acid anhydrides such as 2 (formed from he reaction of MDI with sulfur trioxide); Carbamoyl halides such as 3 (formed from reaction of MDI with hydrochloric acid), or 4. The catalysts, and or catalyst precursors, should be used at concentrations of 5% (w/w) or less (relative to total polymer weight), preferably 2% or less, and most preferably less than 1%.

Catalysts may be useful as processing aids in some formulations.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloro-monofluoromethane. The amount of blowing agent used is less than about 4 percent by weight of the total reactants.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers re always preferred for ease of processing when they are incorporated as part of the "A" or "B" component streams. Other particularly suitable fillers are mica, fumed silica, flake glass, Wollastoniee, calcium carbonate, carbon black, and the like.

The products of the present invention can be shaped into useful articles such as automobile fascias, or panels, by reaction injection molding (RIM) process, which is performed in a RIM machine.

RIM machines are well known in the art and include those supplied by Admiral Equipment Corp. Akron, Ohio by Cincinnati Milacron Corp., Cincinnati, Ohio, by Battlefield Co., Mienerzhagen, West Germany and by Kraus Maffei GmbH, West Germany.

In the RIM process, the polyisocyanate composition is referred to as the "A" Component, and the "B" Component refers to the composition comprising the polyamine and imine-terminated reagents, components B(i) and B(ii), which component may optionally include other isocyanate-reactive material. The reagents may be blended in a suitable container and agitated at a temperature from about 20° C. to about 100° C. for a time between five and sixty minutes using a high sheer blade such as a Cowles blade, at a rotational speed of 50 to 2500 rpm. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C.

The "A" Component and "B" Component are impingement mixed in a forced mix head such as, for example, a Krauss-Maffei mix head. The "A" and "B" Components are pumped to the mix head by a metering pump, for example, a Viking Mark21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent circulation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.10. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamines groups, ketene aminal groups, mercapto(-SH) groups and carboxylic acids, said groups being organically bound.

The "A" stream may contain up to 40% of its weight in solid fillers or reinforcements. In a preferred embodiment, the A stream contains at least 70% by weight of aromatic isocyanate species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mold is heated to a temperature from about 20° C. to 250° C. Suitable molds ar made of metal such as aluminum or steel, although other materials can be used if they can withstand the processing conditions and wear. Usually an external mold release agent is applied before the first molding. These are usually soaps or waxes which are solid at the mold temperature employed.

A molded polymer article is formed after the impingement mixture is in the mold from about 1 second to about 30 seconds, preferably 5 to 20 seconds. The mold is then opened and the molded product is removed from the mold. The molded product may be post cured by placing the product an oven having a temperature between 50° C. and about 250° C. for a time from about one-half hour to about 3 hours.

Mold filling may be accomplished in this invention in a more facilemmanner due to the reaction profile of the systems disclosed herein. Generally there is an induction period of about 1 to 5 seconds, usually 1 to 3 seconds, during which the reaction between the isocyanate- and the imino-functional ingredients is flat or retarded. Following this induction period the reaction accelerates noticeably. This behavior is in sharp contrast to that of the primary aliphatic amines used in the prior art. These amines appear to begin reacting with aromatic isocyanates on contact. These reaction profiles can be visualized by means of the adiabatic temperature rise technique, which involves dispensing reaction systems (or two or more individual ingredients) through an impingement mixing device into aiinsulated cup equipped with thermocouples. The temperature rise due to the reaction is then monitored, at intervals of 0.1 sec. or less, and plotted versus time. Of course, as expected, the induction periods are most clearly evident when the imino compounds are reacted neat (i.e., free of other ingredients) with the aromatic isocyanates. Further evidence of the improved flowability of the systems of the invention relative to the prior art are provided in the Examples. Molded objects can be demolded after a mold residence time of 30 seconds, often 15 seconds or less at a mold temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.10; with the proviso that, if a catalyst for the conversion of isocyanate to isocyanurate groups is present, the index may extend up to about 15.00. Examples of suitable isocyauurate catalysts include alkali metal salts of carboxylic acids, for example, potassium 2-ethylhexoate.

The invention is illustrated but not limited by the following Examples in which all parts, percentages and ratios are by weight unless otherwise indicated. In the Examples, Flexural Modulus was determined by ATM D790; Heat Sag was determined by ASTM D3769-85 and Impact (falling weight) was determined by ASTM D3029-84.

The following glossary of materials is included to identify reaction components not otherwise identified in the Examples.

Glossary

Polyether Polyol 1 is an ethylene oxide capped polyoxypropylene triol having an ethylene oxide content of approximately 15 %, a hydroxyl number of 32 and a hydroxyl equivalent weight of 1750.

Polyether Polyol 2 is a polyoxypropylene diol having a hydroxyl number of 56 and a hydroxy equivalent weight of 1000.

Polyamine D-400 is a polyoxypropylene diamine having an amine equivalent weight of 200, commercially available from Texaco Chemical Corporation as Jeffamine D-400.

Polyamine D-2000 is a polyoxypropylene diamine having an amine equivalent weight of 1000, commercially available from Texaco Chemical Corporation as Jeffamine D-2000.

Polyamine T-3000 is a polyoxypropylene triamine having an amine equivalent weight of 1000, commercially available from Texaco Chemical Corporation as Jeffamine T-3000.

Polyamine T-5000 is a polyoxypropylene triamine having an amine equivalent weight of 1666, commercially available from Texaco Chemical Corporation as Jeffamine T-5000.

Polyisocyanate 1 is an 80/20 mixture of 4,4'- and 2,4'-diphenylmethane diisocyanates, having an NCO-content of 33.56 % by weight.

Polyisocyanate 2 is a uretonimine-modified variant of Polyisocyanate 1 having an NCO content of 31%.

Polyisocyanate 3 is a uretoniiine-modified variant of pure 4,4'-diphenylmethane having an NCO content of 29.1%.

DETDA is a mixture consisting of about 80% 3,5-diethyl-2,4-diaminotoluene and 20 % 3,5-diethyl-2,6-diaminotoluene, commercially available from Ethyl Corporation.

"B" Component 1 is a mixture consisting of 50 parts of the cyclohexanone diimine of Polyamine D-400, 50 parts of DETDA and 3.5 parts of catalyst and internal mol release agent.

"B" Component 2 is a mixture consisting of 50 parts of Polyamine D-400, 50 parts of DETDA and 2.5 parts of catalyst and internal mold release agent.

EXAMPLE 1

Prepolymer 1 A was prepared by adding 54.16 parts (0.0308 equiv.) of Polyether Polyol 1 to 48.15 parts (0.385 equiv.) of Polyisocyanate 1 being stirred at 80° C. The addition was performed at such a rate that the reaction temperature was maintained at 80±3° C. After addition of the polyol was complete, reaction was allowed to continue at this temperature for 90 minutes. The prepolymer, after cooling to room temperature, had an NCO content of 14.5%. Prepolymer 1B was prepared by adding 46.48 parts (0.0465 equiv.) of Polyamine D-2000 slowly and carefully to 53.58 parts (0.429 equiv.) of Polyisocyanate 1 being stirred at 80° C. After completin the addition at 80±3° C., the reaction was continued for a further 30 minutes at this temperature. The prepolymer, after cooling to room temperature, had an NCO content of 15.0%.

Polyisocyanate Composition 1 A (PC-1A), having an NCO content of 14.7%, was prepared by blending 50 parts of Prepolymer 1 A with 50 parts of Prepolymer 1 B. This composition was based upon a polyamine and a polyol at an NH$_2$/OH equivalents ratio of 1.50.

Polyisocyanate Composition 1B (PC-1B), having an NCO of 13.4%, was prepared by first adding 26.54 parts (0.0151 equiv.) of Polyether Polyol 1 to 49.94 parts (0.399 equiv.) of Polyisocyanate 1 being stirred at 80° C., the addition being performed at such a rate that reaction temperature was maintained at 80°±3° C. The temperature was then raised to 90°±3° C. and 25.38 parts (0.0254 equiv.) of Polyamine D-2000 was slowly added, maintaining the temperature at 90°±3° C. After the addition was complete, this temperature was maintained for 150 minutes.

This composition was based upon a polyamine and a polyol at an NH$_2$/OH equivalents ratio of 1.68.

The two polyisocyanate compositions were used in the preparation of elastomers by reaction with "B" Component 1 at an NCO index of 105, both streams being injected at a temperature of 40°-45° C. and a pressure of 200 bars using a Battenfeld SHK-65 RIM machine and a mould temperature of 65° C. The elastomers were post-cured at 160° C. for 30 minutes immediately after preparation. Further details and elastomer properties are give in the following Table:

| "A" Component | PC-1A | PC-1B |
|---|---|---|
| A/B ratio | 221/100 | 243/100 |
| Hard block (%) | 66 | 65 |
| Flexural Modulus (MPa) | 835 | 837 |
| Room temperature impact (Falling dart) (J) | 8 | 44 |
| −20° C. impact (J) (Falling dart) | 8 | 8 |
| Heat Sag (mm) (12 cm O/H, 160° C., 1 hour) | 37 | 9.5 |

It can be seen that the composition made by the sequential reaction of MDI with polyol and polyamine has given higher room temperature impact and lower sag values than the composition made by blending two prepolymers.

EXAMPLE 2

Prepolymer 2 (PP-2), having an NCO content of 15.4%, was prepared by the careful addition of 44.9 parts (0.0449 equiv.) of Polyamine D-2000 and 1 part of oleic acid to 38.5 parts (0.308 equiv.) of Polyisocyanate 1 and 16.6 parts (0.124 equiv.) of Polyisocyanate 2 being stirred at 80°±3° C., followed by reaction at that temperature for a further 30 minutes.

Polyisocyanate Composition 2 (PC-2), having an NCO content of 15.6%, was prepared by first adding 25.39 parts (0.0145 equiv.) of Polyether Polyol 1 to 49.2 parts (0.394 equiv.) of Polyisocyanate 1 being stirred at 80° C., the addition being performed at such a rate that the reaction temperature was maintained at 80°±3° C. The temperature was then raised to 90°±3° C. and 25.39 parts (0.0254 equiv.) of Polyamine D-2000 was slowly added, maintaining the temperature at 90°±3° C. After the addition was complete, this temperature was maintained for 150 minutes.

The reaction mixture was then cooled to 45° C., at which temperature 10 parts (0.0708 equiv.) of Polyisocyanate 3 were added to give a polyisocyanate composition based upon a polyamine and a polyol at an NH$_2$/OH equivalents ratio of 1.25.

The prepolymer and the polyisocyanate composition were used in the preparation of RIM elastomers as described in Example 1. Further details and elastomer properties are given in the following Table.

| "A" Component | PP-2 | PC-2 |
|---|---|---|
| A/B ratio | 211/100 | 209/100 |
| Hard block (%) | 69 | 69 |
| Flexural Modulus (MPa) | 772 | 1062 |
| Room temperature impact (Falling dart) (J) | 12 | 31 |
| −20° C. impact (J) (Falling dart) | 3.5 | 10.5 |
| Heat Sag (mm) (160° C., 1 hour) | 12 (12 cm O/H) | 21 (16 cm O/H) |

It can be seen that the polyisocyanate composition of the invention has given elastomers having higher modulus and impact values than the elastomers obtained from the polyamine based prepolymer.

EXAMPLE 3

Polyisocyanate Composition 3A (PC-3A), having an NCO content of 15.2%, was prepared from 49.11 parts (0.3929 equiv.) of Polyisocyanate 1, 17.84 parts (0.0102 equiv.) of Polyether Polyol 1, 33.13 parts (0.0331 equiv.) of Polyamine D-2000 and 10 parts (0.0708 equiv.) of Polyisocyanate 3 using the method described for Polyisocyanate Composition 2.

The product was based upon a polyamine and a polyol at an NH$_2$/OH equivalents ratio of 3.25.

Using the same preparative method, Polyisocyanate Composition 3B (PC-3B), having an NCO content of 15.5%, was prepared from 48.85 parts (0.3908 equiv.) of Polyisocyanate 33.45 parts (0.0191 equiv.) of Polyether Polyol 1, 18.0 parts (0.0180 equi.) of Polyamine D-2000 and 10 parts (0.0708 equiv.) of Polyisocyanate 3.

The product was based upon a polyamine and a polyol at an NH$_2$/OH equivalents ratio of 0.94.

The two polyisocyanate compositions and Polyisocyanate Composition 2 were used in the preparation of RIM elastomers using the "B" Component 2 at an NCO index of 115. A Krauss-Maffei RIMSTAR 155 machine was used with a mould temperature of 95° C. Further details and elastomer properties are given in the following Table.

| "A" Component | PC-3A | PC-2 | PC-3B |
|---|---|---|---|
| A/B ratio | 234/100 | 229/100 | 231/100 |
| Hard block (%) | 68 | 68 | 68 |
| Flexural Modulus (MPa) | 905 | 1115 | 979 |
| Room temperature impact (Falling dart) (J) | 64 | 65 | 71 |
| −20° C. impact (J) (Falling dart) | 10 | 36 | 14 |
| Heat Sag (mm) (16 cm O/H, 160° C., 1 hour) | 23 | 16 | 19 |

The Table shows that Polyisocyanate Composition 2, prepared from equal weights of polyol and polyamine, has given an elastomer having the best modulus, impact and sag properties.

EXAMPLE 4

Polyisocyanate Composition 4 (PC-4), having an NCO content of 15.5%, was prepared from 50.9 parts (0.407 equiv.) of Polyisocyanate 1, 24.55 parts (0.0245 equiv.) of Polyether Polyol 2, 24.55 parts (0.0245 equiv.) of Polyamine D-2000 and 10 parts (0.0708 equiv.) of Polyisocyanate 3 using the method described for polyisocyanate Composition 2.

The product was based upon a polyamine and a polyol at an NH$_2$/OH equivalents ratio of 1.0 but is not a polyisocyanate composition of the invention because Polyether Polyol 2 has a nominal hydroxyl functionality of 2.

The polyisocyanate composition and Polyisocyanate Composition 2 were used in the preparation of RIM elastomers as descried in Example 3. Further details and elastomer properties are given in the following Table.

| "A" Component | PC-4 | PC-2 |
|---|---|---|
| A/B ratio | 230/100 | 229/100 |
| Hard block (%) | 69 | 68 |
| Flexural Modulus (MPa) | 754 | 1115 |
| Room temperature impact (Falling dart) (J) | 72 | 65 |
| −20° C. impact (J) (Falling dart) | 30 | 36 |
| Heat Sag (mm) (16 cm O/H, 160° C., 1 hour) | >50 (Fail) | 16 |

The Table shows that Polyisocyanate Composition 2 containing a polyether triol has given an elastomer superior in modulus, low temperature impact and heat sag compared with the elastomer prepared from Polyisocyanate Composition 4 containing a polyether diol.

EXAMPLE 5

Polyisocyanate Composition 5 (PC-5), having an NCO content of 15.0%, was prepared from 49.2 parts (0.3936 equiv.) of Polyisocyanate 1, 25.90 parts (0.0148 equiv.) of Polyether Polyol 1, 24.90 parts (0.0249 equiv.) of Polyamine D-2000 and 10 parts (0.0708 equiv.) of Polyisocyanate 3 using the method described for Polysocyanate Composition 2.

The product was based upon a polyamine and a polyol at an $NH_2/OH$ equivalents ratio of 1.68.

This polyisocyanate composition was used in the preparation of RIM elastomers using "B" Component 1 and "B" Component 2, at an NCO index of 105. In other respects, the elastomers were prepared as described in Example 3. Further details and elastomer properties are given in the following Table.

| "B" Component | 2 | 1 |
|---|---|---|
| A/B ratio | 240/100 | 265/100 |
| Hard block (%) | 68 | 68 |
| Flexural Modulus (MPa) | 800 | 912 |
| Room temperature impact (Falling dart) (J) | 38 | 39 |
| −20° C. impact (J) (Falling dart) | | |
| Heat Sag (mm) (12 cm O/H, 160° C., 1 hour) | 9 | 14 |

The Table shows that "B" Component 1 containing an imine has given higher modulus and low temperature impact figures than "B" Component 2 containing an amine.

EXAMPLE 6

A RIM elastomer was prepared by reacting Polyisocyanate Composition 1B with a "B" Component comprising 60 parts of an iso-urea prepared from a polypropylene glycol and N,N'-dicyclohexylcarbodiimide and 40 parts of DETDA at an NCO index of 105. A Battenfeld SHK-65 RIM machine was used with a mould temperature of 100° C. Further details and elastomer properties are given in the following Table.

| A/B ratio | 164/100 |
|---|---|
| Hard block (%) | 46 |
| Flexural Modulus (MPa) | 579 |
| Room temperature impact (Falling dart) (J) | 4 |
| −20° C. impact (J) (Falling dart) | 2 |
| Heat Sag (mm) (12 cm O/H, 160° C., 1 hour) | 6.5 |

The isourea-terminated polyether was prepared in the following manner.

5000 g of PPG 2000 (Polyether Polyol 2) (2.5 moles), 1289.0 g of DCC (6.25 moles) and 12.5 g of Cu(I)Cl as catalyst were charged to a ten liter reactor which had been fitted with a mechanical stirrer, nitrogen sparge, and temperature control thermocouple. The temperature was set to 130° C. The progress of the reaction was monitored by IR analysis by means of the reduction of a broad OH band at 3500 $CM^{-1}$ which indicated the consumption of PPG 2000, the reduction of a peak at 213 $cm^{-1}$ which indicated the consumption of DCC, and the growth of a peak at 1660 $cm^{-1}$ which indicated formation of isourea end groups. An IR spectrum taken after 110 minutes indicated that the reaction had started. After 1210 minutes another gram of catalyst was added since an IR spectrum indicated that the rate of reaction had slowed greatly. After 1475 minutes an IR spectrum showed no further reduction in the OH peak so the reaction was considered complete and the heat was turned off afte 1490 minutes.

EXAMPLE 7

A RIM elastomerwas prepared by reacting polyisocyanate composition 1B with a "B" component comprising 60 parts of a guanidine prepared from a polyoxypropylene triamine and N,N'-dicyclohexylcarbodiimide and 40 parts of DETDA using the procedure of Example 6.

Further details and elastomer properties are given in the following Table.

| A/B ratio | 158/100 |
|---|---|
| Hard block (%) | 46 |
| Flexural Modulus (MPa) | 592 |
| Room temperature impact (Falling dart) (J) | 53 |
| −20° C. impact (J) (Falling dart) | 36 |
| Heat Sag (mm) (16 cm O/H, 160° C., 1 hour) | 19 |

The guanidine-terminatdd polyether was prepared by reacting 7500 g (1.5 moles) of Polyamine T-5000, 770.6 g (3.74 moles) of N,N'-dicyclohexylcarbodiimide and 7.5 g copper (I) chloride at 130° C. for 17.5 hours.

EXAMPLE 8

Polyisocyanate Composition 8, having an NCO content of 15.3%, was prepared by the careful addition of a mixture of 37.3 parts (0.0373 equiv.) of Polyamine D-2000 and 6.6 parts (0.0066 equiv.) of Polyamine T-3000 to 56.14 parts (0.449 equiv.) of Polyisocyanate 1 at 80°±3° C. After copletion of the addition, the reaction was continued for a further 50 minutes at the same temperature.

The polisocyanate composition was used in the preparation of a RIM elastomer using "B" Component 1 and the procedure described in Example 6. Further etials and elastomers properteis are given in the following Table.

| A/B ratio | 213/100 |
|---|---|
| Hard block (%) | 70 |
| Flexural Modulus (MPa) | 1084 |
| Room temperature impact (Falling dart) (J) | 2.3 |
| −20° C. impact (J) (Falling dart) | <0.5 |
| Heat Sag (mm) (16 cm O/H, 160° C., 1 hour) | 27 |

It can be seen that the elastomer prepared from a wholly amine based polyisocyanate composition, although having a high modulus, has poor impact and heat sag properties.

We claim:

1. A reaction system for use in making a reaction injection moulded elastomer, said system comprising the following components:
(A) a polyisocyanate composition comprising a reaction product of a stoichiometric excess of an organic polyisocyanate and:
  (i) a polymeric polyol having an average nominal hydroxyl functionality greater than 2 and an average hydroxyl equivalent weight of from about 500 to about 5000, and
  (ii) a polymeric polyamine having an average nominal primary and/or secondary amino functionality of from about 2 to about 3 and an average amine equivalent weight of from about 500 to about 5000, the polyol and the polyamine having glass transition temperatures below room temperature.
(B) an isocyanate-reactive composition comprising at least one imino-functional compound which has at least one —imino group that is directly reactive towards isocyanates and which conforms to the following structure

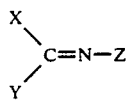

wherein X, Y, and Z are chemical moieties which collectively form the rest of said compound and are each independently selected from the group consisting of H and organic radicals which are attached to the imino unit

of said compound through N, C, O, S, Si or P; the central carbon atom of the imino unit

of said imino group being bonded to three atoms.

2. A reaction system according to claim 1 wherein the organic polyisocyanate used in preparing the polyisocyanate composition comprises 4,4'-diphenylmethane diisocyanate, 2,4'-diphenylmethane diisocyanate or a mixture thereof.

3. A reaction system according to claim 1 or claim 2 wherein the average nominal hydroxyl functionality of the polyol used in preparing the polyisocyanate composition is in the range from 2.5 to 4.

4. A reaction system according to claim 3 wherein the average nominal hydroxyl functionality of the polyol is about 3.

5. A reaction system according to claim 1 wherein the average hydroxyl equivalent weight of the polyol is in the range from 800 to 2000.

6. A reaction system according to claim 1 wherein the polyol is a polyether polyol.

7. A reaction system according to claim 6 wherein the polyether is a polyoxypropylene or poly(oxyethyleneoxypropylene) polyol.

8. A reaction system according to claim 1 wherein at least 70% of the amino groups in the polymeric polyamine used in preparing the polyisocyanate composition are primary amino groups.

9. A reaction system according to claim 1 wherein the average nominal amino functionality of the polyamine is in the range from 2.5 to 3.

10. A reaction system according to claim 1 wherein the average amine equivalent weight of the polyamine is in the range from 800 to 2000.

11. A reaction system according to claim 10 wherein the average amine equivalent weight is in the range from 800 to 1700.

12. A reaction system according to claim 1 wherein the polyamine is a polyether polyamine.

13. A reaction system according to claim 12 wherein the polyether is a polyoxypropylene diamine or triamine.

14. A reaction system according to claim 1 wherein the excess of organic polyisocyanate used in preparing the polyssocyanate composition is such that the composition has an NCO content in the range from 8 to 25%

15. A reaction system according to claim 14 wherein the NCO content is in the range from 12 to 20.

16. A reaction system according to claim 1 wherein the relative proportions of polyol and polyamine used in preparing the polyisocyanate composition corresponds to an initial hydroxyl to amino group ratio in the range from 5:95 to 95:5.

17. A reaction system according to claim 16 wherein the hydroxyl to amino group ratio is in the range from 25:75 to 75:25.

18. A reaction system according to claim 17 wherein the hydroxyl to amino group ratio is in the range from 35:65 to 65:35.

19. A reaction system according to claim 1 wherein the isocyanate-reactive composition comprises an imino-functional chain extender having a molecular weight less than 1500 and/or an imino-functional polyether resin having a molecular weight of at least 1500.

20. A reaction system according to claim 19 wherein the chain extender has a molecular weight less than 600.

21. A reaction system according to claim 19 or claim 20 wherein the polyether has a molecular weight of from 2000 to 8000.

22. A reaction system according to claim 1 wherein the imino-functional compound is selected from the following:

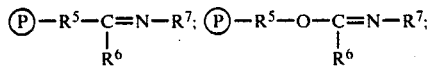

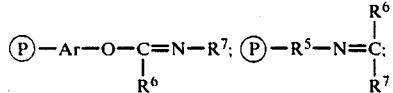

-continued

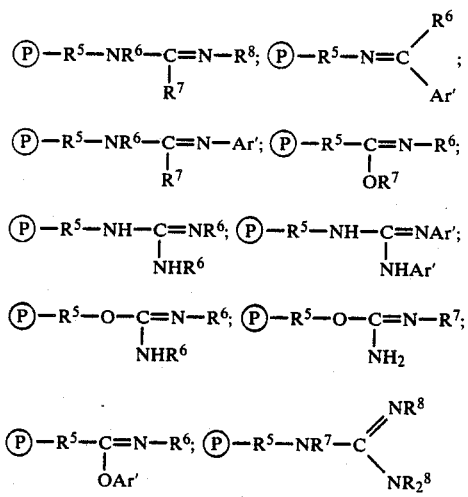

wherein:
R[5] and Ar are divalent aliphatic and aromatic organic linking groups, respectively;
Ⓟ a polyether or hydrocarbon chain or radical, to which said imino (C=N) functional group is attached.
R[6] is H or a monovalent organic aliphatic group of 1 to 10 carbons:
R[7] and R[8] are monovalent aliphatic organic groups of 1 to 10 carbon atoms, and
Ar' is a monovalent aromatic organic group of 6 to 18 carbon atoms.

23. A reaction system according to claim 1 wherein the isocyanate-reactive composition (B) comprises
(i) a chain extender comprising
 (a) 0–100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diaines, and, correspondingly,
 (b) 100–0% of an imino-functional aliphatic compound having a number-averaged molecular weight less than 1500 and a number-averaged functionality of isocyanater reactive imino units of about 1 to about 3, and
(ii) an imino-functional polyether resin having an average of from about 1.1 to about 5 isocyanate-reactive imino groups per molecule and a number-averaged molecular weight of from 1500 to about 10,000, wherein said imino groups constitute at least 50 mol percent of the isocyanate-reactive groups in said polyether resin, and at least 50 mole percent of said imino-functional polyether species contain two or more imino (C=N) groups per molecule;
wherein said system is used to make a polymer by impingement mixing a stream comprising said reaction component (A) and a stream comprising said reaction component (B).

24. A reaction system as defined in claim 23, wherein said lower molecular weight imino-functional component (B)(i)(b) has a number averaged molecular weight less than about 600, a number averaged functionality of imine (C=N) groups between about 1.5 and about 2.5, and is an entirely aliphatic species.

25. A reaction system according to claim 23 wherein component B(i)(a) is an aromatic polyamine substantially free of elements other than C, N, and H and which contains at least one alkyl group of 1–4 carbon atoms ortho to each primary aromatic amine group.

26. A reaction system according to claim 23 wherein component B(ii) is an aliphatic, iminofunctional, liquid resin based predominantly upon polyoxypropylene and has a molecular weight in the range of from about 2000 to about 8000 and a number averaged functionality of imino (C=N) units from about 2 to about 5.

27. A reaction system according to claim 23 wherein the ratio of isocyanate equivalents in stream (A) to the total equivalents of isocyanate reactive groups, including imino (C=N) groups, in stream (B) is between 0.8 and 1.90; with the proviso that, if a catalyst for the isocyanurate reaction is present, said ratio may extend up to 15.

28. A reaction system according to claim 23 wherein said component B(i) also contains hydroxyl groups; and wherein the ratio of said hydroxyl groups to imino (C=N) units is between about 0.25 to 1 to about 1 to 0.25.

29. A reaction system according to claim 1 wherein the isocyanate-reactive composition comprises
(i) chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and
(ii) an imino-functional chain extender having a molecular weight less than about 600 and a number-averaged functionality of imino units between about 1 and about 2.5, said imino groups being capable of reacting directly with isocyanates, wherein the ratio by weight of component B(i) to B(ii) being between about 1:9 and about 9:1.

* * * * *